Jan. 17, 1939.  F. L. O. WADSWORTH  2,144,470
APPARATUS FOR FEEDING GLASS
Original Filed May 22, 1934   2 Sheets-Sheet 2

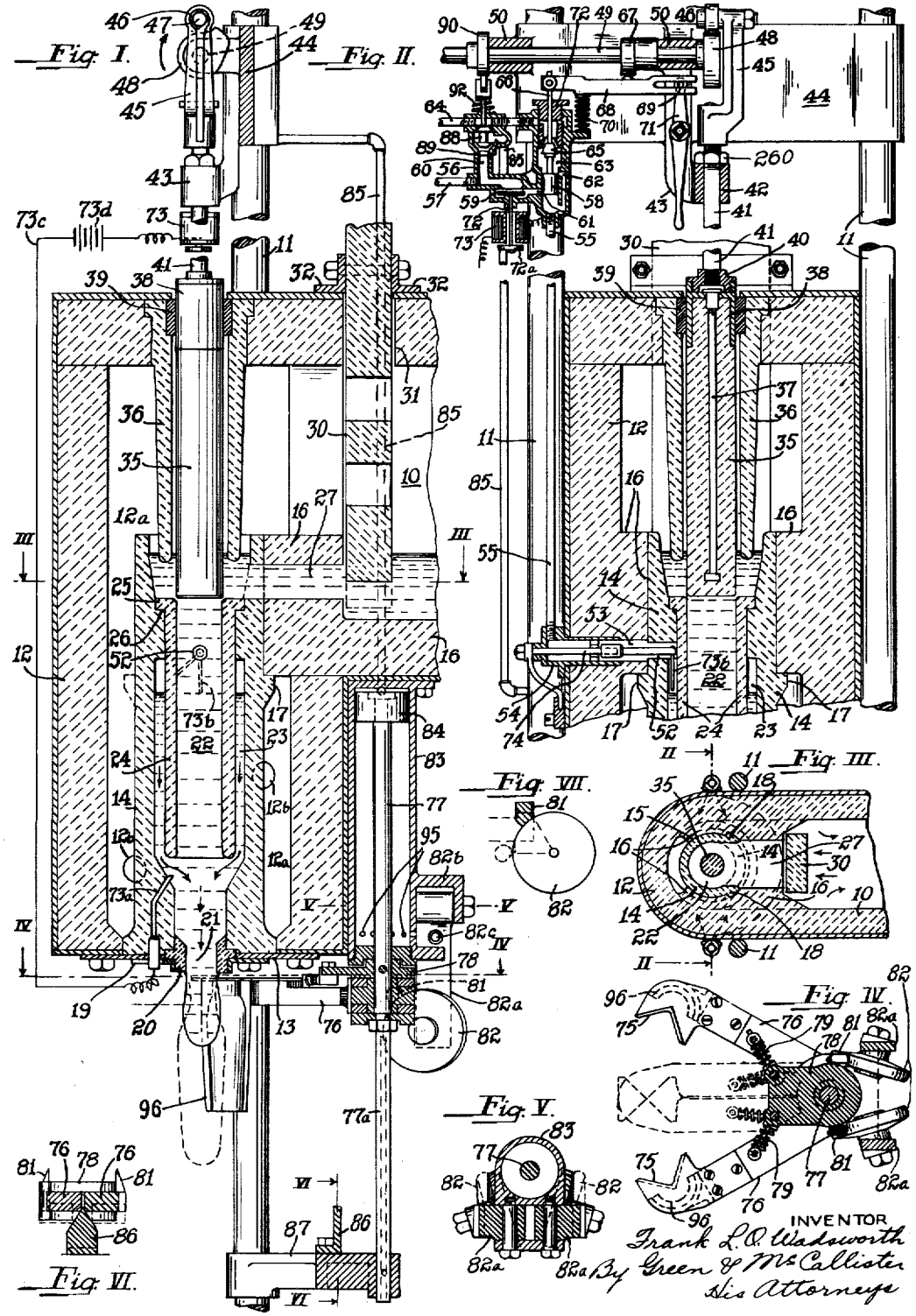

Patented Jan. 17, 1939

2,144,470

UNITED STATES PATENT OFFICE 2,144,470

APPARATUS FOR FEEDING GLASS

Frank L. O. Wadsworth, Pittsburgh, Pa., assignor to Ball Brothers Company, Muncie, Ind., a corporation of Indiana Application May 22, 1934, Serial No. 726,874
Renewed May 21, 1937

18 Claims. (Cl. 49—55)

This invention relates to the art of feeding plastic material such as molten glass, and more particularly, to an improved procedure for delivering such material in a continuously flowing, but pulsating stream, for severing such a stream into successive mold charges, and for delivering such mold charges to the molds of the forming machine at relatively high delivery speed and in rapid succession.

A further object of my invention is to provide a forced flow feeder of the pneumatic impulse type which is capable of being operated effectively at high speed, and in which the molten material is fed in a continuously flowing stream of alternately increased and decreased velocities or volumes of flow to produce a series of regularly recurrent enlarged stream sections of predetermined volume and shape that may be successively severed from the continuously moving stream and delivered to the successive molds of the forming machine at a high delivery velocity and with a minimum loss of heat.

Another object of this invention is to provide a forced flow feeder of the pneumatic impulse type in which a predetermined quota of glass is periodically transferred from a dominant pool to a segregation chamber positioned above a delivery orifice, without arresting the flow from the orifice, and is then subjected to a supplemental expulsion force for the purpose of augmenting the flow therethrough.

It is also an object of this invention to provide a pneumatic impulse feeder having a segregation chamber which is periodically replenished from the dominant pool of molten material, under the combined influence of gravity and vacuum action, and in which the quantity of material thus transferred to the segregation chamber is controlled as to amount, and is employed to augment a continuously flowing stream and produce regularly recurrent enlarged sections thereof of definite shape and contour which, when severed from the stream constitute a succession of mold charges which are of uniform size and shape.

Another feature of my invention is the provision of a segregation chamber, and of means for automatically arresting the charging of such chamber when the plastic material delivered thereto has reached a predetermined level therein.

Still another purpose of the present improvements is to provide a shear mechanism which will effect a rapid severance of the continuously formed, preshaped stream sections into separate mold charges, and will deliver these charges, to successive molds of a forming machine, at a speed greatly in excess of the velocity such charges would attain while falling freely under the influence of gravity; or, stated in another way, this particular purpose is to provide a severing mechanism which will perform the combined functions of cutting off successive mold charges from a continuously flowing stream, and projecting each severed mold charge toward and into a moving mold under the joint influence of gravity and of a supplemental accelerating force.

Stated in general terms, one of the characterizing features of this invention is the formation and delivery of a stream of molten glass at a mean speed of delivery substantially in excess of that usually obtained in present day feeder structures; and in which such increased delivery speed is secured by continuously subjecting the glass in the delivery orifice to the gravity pressure of a relatively deep body of the molten material, which is maintained at the proper degree of plasticity—viz., at the proper temperature—to insure a flow at a rate responsive to the increased gravity head; and another associated feature of the invention is the periodic acceleration of the augmented outflow, produced by this increased gravity head, by the segregation or substantial isolation of a portion of the glass flowing from the parent body toward the orifice, and subjecting this segregated mass to a supplemental extrusion force which acts to produce a series of regularly recurrent enlarged stream sections of uniform size and shape.

These and other objects and features, which will hereinafter be made readily apparent to those skilled in this particular art, are accomplished by means of the apparatus and procedure described in the following specification in connection with the accompanying drawings, wherein:

Figure I is a longitudinal vertical section in the plane of the flow orifice of one form of apparatus for carrying out my invention;

Fig. II is a transverse vertical section of the upper part of the apparatus illustrated in Fig. I;

Fig. III is a section on the plane III—III of Fig. I;

Fig. IV is a section on the plane IV—IV of Fig. I;

Fig. V is a section on the plane V—V of Fig. I;

Fig. VI is a section on the plane VI—VI of Fig. I;

Fig. VII is a diagrammatic view illustrating the means for closing the shear blades, and the relative movement of the blades transversely and axially of the flowing stream during the severing operation;

Fig. VIII is a vertical longitudinal section through the delivery orifice of a second form of apparatus embodying my invention;

Fig. IX is a plan view of the apparatus illustrated in Fig. VIII;

Fig. X is a section taken on the plane X—X of Fig. VIII;

Fig. XI is a rear elevation of a portion of the shear mechanism shown in Fig. VIII;

Fig. XII is a section on the plane XII—XII of Fig. XI;

Fig. XIII is a section on the plane XIII—XIII of Fig. X; and

Fig. XIV is a developed section of the circular cam track that forms a part of the means for raising and lowering the flow control mechanism.

The apparatus forming an embodiment of one phase of my invention, comprises a receptacle for a dominant pool of thermoplastic material such as molten glass which, as here shown, is in the form of a boot or forehearth extension from the front end of a glass melting furnace (not shown); and which is provided with a submerged flow or delivery orifice located well below the surface of the material within the boot, and therefore normally covered by a column of molten glass of substantial height, for the purpose of obtaining a high rate of gravity flow therethrough. A downwardly extending supply passage or conduit of substantial length forms a means for communication between the forehearth receptacle and the delivery orifice; and this passage communicates at its lower end with a segregation chamber which is positioned immediately above, and in axial alignment with, the said orifice. Both the supply passage and the supplemental segregation chamber are in continuous open communication with the flow orifice, but the cross sectional area of the former is so much greater than that of the orifice that, under normal free flow conditions, the passage will deliver a much larger quantity of glass from the forehearth receptacle than can escape through the orifice, with the consequent result that a supplemental body of molten glass builds up or accumulates in the segregation chamber.

In order to produce recurrent periods of increased or accelerated flow from the orifice, this accumulated body of glass in the segregation chamber is periodically cut off from the main source of supply and is subjected to a supplemental extrusion force, which complements the action of gravity in expelling the molten material. Means are also provided for controlling the flow of glass from the dominant pool through the supply passage for the purpose of preventing the periodically acting supplemental force, applied to the accumulated body of glass in the segregation chamber, from forcing this material back into the forehearth receptacle, and thus diminishing or minimizing its expulsion effect during the periods of accelerated flow through the orifice.

In the illustrative embodiments of my invention herein disclosed, the communication controlling means, above referred to, comprises reciprocating plunger members, which move up and down in substantial axial alignment with the delivery orifice; but it should be understood that the primary function of these members is different from that of the reciprocating elements of what are ordinarily termed "sticky" plungers, in which the downward movement of the plunger is used to "stuff" or enlarge the outflowing stream of glass, and in which the maximum outflow is produced by and during the downward movement itself. In my organization, the primary function of the movable plunger is to act as the movable element of a control valve for the supply passage to the segregation chamber, and the maximum flow from the orifice is obtained when the movable member is at rest at the lowest point in its movement. Another important functional difference between my improved feeder and the so called "sticky" plunger feeders, is that the plunger valve element of my construction is intentionally so positioned and operated that its upward movement does not exert any material lifting or retractive effect on the glass in the delivery orifice; and does not therefore interfere with a continuous or uninterrupted flow therefrom under the action of gravity.

My improved apparatus also includes a severing mechanism which is so designed and operated that it is adapted to sever the continuously flowing and periodically enlarged stream without retarding its downward movement and without distorting its preformed contour; and is further adapted to directly confine and project each successively cut off "gob", or stream section, into a mold, or receiving receptacle, at such velocity as to completely fill the mold cavity, and also enable this delivery to be made, if desired, when the receiving receptacle is moving at a relatively high speed. This accumulated velocity of forced delivery is substantially greater than the velocity which would be attained by the charge if it were merely permitted to fall freely into the mold after its severance from the stream; and this feature of my improvements materially reduces the time of delivering each successively formed and severed mold charge, to a forming machine; thereby increasing the possible number of such deliveries per unit of time. It also permits the receiving molds to be positioned in close proximity to the feeder orifice, and decreases the loss of heat to the surrounding air.

In order to facilitate the delivery of a rapid succession of separate mold charges, I also employ means for accelerating the accumulation of each segregated body of glass in the segregation chamber and other means for controlling and accelerating the subsequent discharge of this segregated material from the delivery orifice. In one of the embodiments here illustrated, these results are effected by subjecting the interior of the segregation chamber to suction or sub-atmospheric pressure during the periods of flow from the dominant pool to the said chamber, and then subjecting the surface of the glass therein to super-atmospheric pressure while the communication between the dominant pool and the delivery orifice is substantially closed.

It will be apparent that the above described procedure is materially different from that which characterizes the operations of other present day feeders of either the "sticky plunger" or the pneumatic (air) control type—because, in the practice of my invention, the glass is continuously flowing from the delivery orifice, under a materially greater gravity head than it is possible to employ in types of feeding mechanism just mentioned; because this substantially increased gravity flow is at no time retracted, or materially retarded at the time when glass is flowing from the dominant pool to and through the delivery orifice, and because the full effect of the supplemental extrusion force—which is applied when the supply passage leading from the forehearth chamber to the segregation chamber and the delivery orifice is closed—is exerted on the outflowing glass to accelerate its mean rate of discharge and thus form the enlarged gobs or stream sections that are to be severed into successive mold charges.

Another feature of my improved method and apparatus is the provision of means whereby the size and shape of the successively formed and cut off mold charges may be widely varied by various adjustments of the mechanical relationship of the operating parts, without, in any way, changing the time or phase relation of the operating forces. One reason for this is that these variations in size and shape can be more readily effected when the flow through the orifice is never interrupted or arrested or retarded either before or after the time of severance of the flowing stream, and other reasons therefore will be made apparent in the more detailed consideration of the specific exemplary constructions here disclosed.

Referring to the specific form of apparatus shown in Figs. I—VII of the drawings, a forehearth extension or boot 10, of the usual form, is connected to the front end of a glass melting tank or furnace (not shown) and is enclosed in a metal frame that is supported by upright posts 11. This boot forms a receptacle for a dominant pool of molten glass which is, or may be maintained at the desired temperature by burners such as are usually employed for that purpose; and it is provided with a sub-forehearth 12 which projects downwardly a substantial distance below the bottom of the main dominant pool. The boot and the sub-forehearth are formed of, or lined with, refractory material; and a plate 13 is bolted against the lower end of the sub-forehearth frame to form a support for an upwardly extending sleeve or tubular member 14, also formed of refractory material. The upper end of this member is embraced in a segmental recess 15 (Fig. III) which is formed in the front end of the floor block 16 of the main forehearth; and, in order to perfect the seal between these engaged parts, the member 14 is provided with a shoulder 17, which abuts against the lower surface of floor block 16, and with side flanges 18—18 which engage with correspondingly grooved portions of this block. The interior of the sleeve 14 is divided into a delivery passage or chamber 22, and a segregation chamber 23 by an inner sleeve 24, having a flanged upper end 25, which is received by, and supported on, a shoulder 26 on the inner surface of the sleeve 14. These two members 14 and 24 are preferably concentrically arranged, consequently the chambers 22 and 23 are concentric chambers. The sleeve 24 terminates short of the lower end of the member 14, the bore of which is reduced in diameter below the sleeve 24 to receive a removable orifice bushing or ring 20, which defines the size and shape of the effective delivery orifice 21. This orifice ring is supported by a plate 19 which is detachably secured to the lower face of the plate 13 by any suitable means, such as the bolts shown.

The external diameter of the sleeve 14, is substantially less than the inner diameter of the sub-forehearth walls, and the annular space thus provided forms a heating chamber 12a, which surrounds the sleeve assembly 14–24, and is in open communication with the upper forehearth, above the surface of the glass contained therein. As indicated by the dotted arrows in Fig. III, suitable burners project tangentially through openings 12b, in the side walls of the sub-forehearth, and are employed for the purpose of heating the enclosed sleeve assembly and the molten material contained therein, to any desired and predetermined temperature. The gases of combustion from these burners pass circumferentially around the annular heating chamber 12a, and then upwardly therefrom into the main forehearth and back into the melting furnace.

Direct communication is established between the parent body of glass in the main forehearth and the segregation chamber 23, by means of a horizontal passageway 27 in the block 16, which opens into the upper end of the tubular sleeve member 14, and also by means of the vertical passageway 22 in the inner concentric sleeve 24. The opening at the inner end of the passageway 27 is controlled by a vertically adjustable gate or bridge block 30 that extends up through the roof of the main forehearth and is held in any desired position by means of angle members 32 between which the block is clamped, and which rest on the roof plate of the forehearth. This arrangement also constitutes a simple form of seal which will prevent the escape of hot gases through the spaces between the sides of the gate and adjacent faces of the roof block opening through which it projects, without interfering with the easy adjustment of the gate, for the purpose of varying the inlet area of the passage 27.

A refractory plunger 35 is reciprocatively mounted above and in line with the upper end of the vertical passage 22, and is extended upwardly through the roof of the forehearth structure. This plunger is supported and guided by a metallic cap sleeve 38 which is secured thereto by a central bolt 37 that is embedded in the body of the plunger (Fig. II) and both of these parts—the cap and bolt—are preferably made of a suitable heat resisting alloy, such as nichrome steel, that will not be detrimentally affected by the hot glass. In order to prevent the escape of heat and gases through the opening in the roof structure through which the plunger projects, the latter is surrounded by a sleeve 36 which is seated in a shouldered recess in the roof block, and is extended downwardly into the glass in the top of the tubular member 14. The upper end of this guard sleeve carries a graphite bushing 39 that forms a guide bearing for the plunger cap 38.

An operating rod 41 is detachably secured to the plunger cap 38, by means of a coupling 40, and is extended upwardly through a sleeve guide bearing 42 that is carried by a bracket 43 which forms a part of a T-shaped frame 44, supported by the posts 11—11. The upper end of the rod 41 is provided with an L-shaped head 45 which carries a roller 46 that is engaged by a cam 48 secured to a cam shaft 49, which is rotatably mounted in suitable bearings 50 of the frame 44, and is driven at a predetermined speed by a variable speed motor (not shown). As the cam 48 revolves, the rod 41 and the plunger members coupled thereto are periodically raised and lowered to open and cut off communication between the dominant pool of molten glass in the boot and the delivery passage 22.

The cross sectional areas of the passageways 27 and 22 are materially larger than that of the flow orifice 21, so that when the plunger valve 35 is raised a substantially greater quantity of glass will flow towards the orifice than can be delivered therethrough under the action of gravity; and this excess flow of glass will rapidly accumulate in the segregation chamber 23, and will rise therein to a height determined by the operating conditions. Inasmuch as this supply of glass enters the bottom of the chamber 23, and inasmuch as the top of this chamber is closed by the head of the inner sleeve member 24, it is apparent that a quantity of air will be trapped above the rising glass, and the height to which the glass rises in the chamber will be limited by the compression of this trapped air.

In order to obtain a more adequate and complete control, both of the speed at which the inflowing glass will be accumulated in the segregation chamber 23, and also of the rate at which the segregated glass is expelled therefrom through the delivery orifice 21, the member 14 has a lateral port 52 therein which communicates with the upper end of the chamber 23, and which is in seated registry with a larger port or opening 53 in the adjacent end floor block 16 of the main forehearth. The outer end of this last mentioned opening is closed by a metal bushing 54 which is seated into it and is provided with a pipe connection 55, that leads to a valve box 56, which is provided with a cam operated valve mechanism so arranged as to alternately connect the port opening 52 with suitable sources of sub-atmospheric and super-atmospheric pressures. In the particular arrangement illustrated in Fig. II, this valve control assembly comprises a pipe connection 57 which leads to a vacuum pump or a vacuum reservoir, a second pipe connection 64, which leads to a source of compressed air, and a double acting two-way piston-needle valve 58–65, which is mounted on a valve stem 66, and is actuated by a cam 67 on the shaft 49. The piston valve element 58 concurrently controls the port opening 61, between the pipe 55 and the vacuum conduit 57, and the by-pass port 62 between this pipe (55) and the valve chamber 63; and the associated needle valve element 65 controls the connection between this chamber 63 and the pressure supply conduit 64. When the connected valve elements are raised, the connections between the pipes 55–64 are closed—both by the seating of the needle valve element 65 and by the closing of the port 62—and communication is established between the vacuum conduit 57 and the pipe and passage connections 55—53—52 that lead to the top of the segregation chamber 23. The resultant reduction in pressure in this chamber accentuates the inflow of glass through the now connected passageways 27—22 (the plunger 35 being at this time raised) and correspondingly accentuates the accumulation of a fresh charge of molten material above the delivery orifice, without interfering with the continuous direct discharge of another portion of the incoming glass, from the passageway 22 to and through the outlet 21. As soon as this recharging of the segregation chamber 23 is completed, its connection with the vacuum conduit 57 is cut off (see infra); the plunger 35 is moved downward to close the upper end of the supply passage 22; and compressed air is admitted to the pipe 55, by the concurrent unseating of the needle valve element 65 and the opening of the piston controlled port 62. This subjects the accumulated charge of glass in the segregation chamber to a supplemental, or complemental pressure, which immediately increases the outflow of glass from the delivery orifice 21, and "stuffs" or swells the flowing stream to produce and preform the desired mold charge sections.

In order to provide means for readily varying the opening movement of the needle valve 65—and thus controlling the degree of pressure applied to the outflowing glass—an adjustable actuating mechanism is interposed between the valve stem 66 and the valve cam 67. As here shown this mechanism comprises a slotted link 68, which is pivotally connected at one end to the valve stem 66, and is rockably supported at its other end on the movable fulcrum pin 69. This link is engaged, at an intermediate point of its length by the cam 67 against which it is yieldingly held by the compression spring 70. The fulcrum pin 69 is carried on the upper end of an angularly adjustable lever 71; and by moving the lever to alter the point of engagement of the pin 69 with the link 68, the movement of the connected valve elements 65—58, under the action of the cam 67, can be easily varied to control the admission of compressed air to the upper end of the segregation chamber. The time of opening of the needle valve 65 may also be independently controlled by the axial adjustment of the threaded head 72 in which this valve is seated; and the relative magnitude, or relation of the forces acting on glass in the segregation chamber at different times during the supplemental pressure action is further controlled by the circumferential form or contour of the cam element 67.

It will be understood that the cam control valve system above described is operated in synchronism, and in definite timed relation, with the plunger 35, and that the phase relationship between these movements is controlled, and if desired readily varied, by the angular relationship, or setting, of the two cams 48 and 67. In consequence of this, the glass in the segregation chamber 23 may be subjected to either sub-atmospheric or super-atmospheric pressure at definite and predetermined intervals in the cycle of plunger movement. As normally operated the glass in this chamber is subjected to vacuum action when the plunger is lifted away from the inlet end of the passage 22, and is subjected to super-atmospheric pressure when the plunger is in the position shown in Figs. I and II, or in the position in which communication is shut off between the dominant pool and the delivery orifice 21. The degree of vacuum to which the chamber 23 is subjected may, of course, be changed at will by controlling the pressure in the conduit 57, and the rate of accumulating the supplemental body of glass in the segregation chamber can be correspondingly varied. The flow of compressed air from the conduit 64 to the upper end of the chamber 23, can also be controlled and varied within wide limits, not only by changing the fixed pressure in the supply line, but also by the several valve and cam adjustments above described; and both the size and the shape of the successively enlarged stream sections, which form the subsequently severed mold charges, can, in this manner, be definitely controlled and maintained under all conditions of operation.

In the apparatus under consideration the delivery orifice is preferably located at a substantial distance (e. g. from 20 to 30 inches) below the surface of the glass in the main forehearth; and the gravity pressure at the orifice is commensurate with a column of glass of this height, and is materially in excess of that existant in any other form of flow feeder. At the usual temperatures of operation the free flow of the molten material under such a head—through a passageway of any substantial size—is very rapid; and when the passageway 22 is opened, by the lifting of the plunger 35, there is an immediate downward rush of glass toward the delivery orifice and into the lower end of the segregation chamber. When the upper end of this chamber is connected to a vacuum line the normal gravity flow of glass thereto is still further accelerated; but as already stated, the cross-sectional areas of the supply ports and passages 21—22 etc., are so much larger than the area of the delivery orifice 21 that this accelerated flow into the chamber 23, does not sensibly affect the continuous concurrent discharge of glass from the much smaller opening 21.

In order to prevent the glass in the chamber 23, from rising above the level of the port 52 (under the action of gravity alone, or of gravity plus vacuum), I provide an automatic cut-off valve mechanism, which will close the upper end of the pipe connection 55, as soon as the molten material reaches a predetermined height in the said chamber. This traps and confines a definite quantity of air in the upper end of the chamber, and the further rise of glass therein is resisted by the compression of this trapped air. In the construction shown in Figs. I and II, this automatic cut-off control comprises a large disc valve 59, which is interposed in the passageway leading from the vacuum conduit 57 to the valve port 61. This disc valve 59 is provided with a downwardly extended stem 72 that is attached to the movable armature 72a of an electromagnet 73. The valve 59 is normally held open by its own weight and by the weight of the stem and the parts associated therewith; but when the glass in the chamber 23 reaches a predetermined level, the electromagnet 73 is energized, its armature 72a is lifted, and the valve 59 is closed; thus cutting off communication between the chamber 23 and the vacuum pipe 57. This is accomplished by connecting the two terminals of the electromagnet with two contact fingers 73a and 73b, one of which is immersed in the glass in the lower part of the segregation chamber and is connected, by the wire 73c and the battery 73d, to the lower end of the magnet coil, and the other of which is mounted on an angularly adjustable pin 74 passing through the port openings 53—52 and connected to the upper end of the coil by the metal pipe fittings 54—55. The lower contact 73a and its connections to the magnet coil, are of course, insulated from the metal parts of the forehearth construction; and when the level of the glass within the segregation chamber reaches the element 73b, the circuit is completed and the electromagnet is energized to close the valve 59. As soon as the plunger valve 35 is lowered to shut off the connection between the main supply of glass and the segregation chamber, and the level of glass in the latter chamber begins to fall, the circuit through the glass and the two contacts 73a—73b will be broken with the result that the valve 59 will again fall open, and permit the subsequent flow of fluid, to and from the chamber port 52, to be solely controlled by the connected valve elements 58—65.

In order to effectively separate the stream continuously issuing from the orifice 21, into mold charges, it is necessary to employ a severing mechanism which will not impede the flow of the stream, and which will sever it at the proper time in connection with the expulsion of glass from the chamber 23. I accomplish these results by providing a shear mechanism which moves with or faster than the stream during the operation of severance, and faster than the oncoming end of the stream after the severance is completed. The mechanism which I have provided also makes it possible to vary the ratio or relation of the transverse and axial movements of the shear blades both during and after severance; and thus effect a mechanical shaping of both the lower end of the severed stream and also of the upper end of the severed mold charge. My improved shear mechanism is also designed and adapted to shield the cut off "gob" from the chilling or lateral displacement effect of surrounding air currents; and to deliver the shielded charge to a receiving receptacle at a speed which is substantially greater than that which it would acquire if allowed to fall freely under the action of gravity alone.

The form of severing mechanism illustrated in Figs. I to VI, inclusive, comprises a pair of opposed shear blades 75, which may be of any suitable form, and which are mounted on a pair of shear arms 76 that are concentrically, or coaxially, journaled on a common shaft 77, so that they may be concurrently swung from the open position, illustrated in full lines in Fig. IV, to the closed position, illustrated in dotted lines in that figure. A plate 78 is rigidly secured to the rod 77 and is located immediately adjacent the arms 76. This plate forms a support for two pivoted spring seats that receive two coil springs 79—79, whose outer ends are engaged by pivoted heads on the arms 76—76, and which are so positioned that they perform the double function of holding the shear blade elements 75—76, in the closed (dotted line) position of Fig. IV and of "snapping" them back to open position, after the opening movement has been initiated by an external force. The rear end of each arm 76 carries a laterally projecting lug 81, which is so positioned as to engage with the edge of rotatable disc or cam roller 82, when the supporting shaft 77 is moved downwardly; and as this movement continues, the rolling cam wheel exerts a radial thrust on the engaged lug and thereby moves the associated shear blade arm to its closed position. Each roller 82 is mounted on an arm 82a which is pivotally supported on a bracket 82b extending from the side of an operating cylinder 83, that is secured to the rear side of the sub-forehearth 12. The arms 82a—82a are connected by a coil spring 82c, which acts to normally hold the arms, and the cam rollers 82—82, in the full line position shown in Figs. I, IV, and V, when they are acting to close the shear blades; but which permits them to be moved outwardly away from each other, during a subsequent step in the operation of the shear mechanism (see infra).

The shaft 77 passes through a stuffing box at the lower end of the cylinder 83 and is attached to a piston 84, which is moved down and up by the successive application of a super-atmospheric and sub-atmospheric fluid pressure to its upper surface. The longitudinal axis of the cylinder 83, and of the shaft, or piston rod 77, is parallel to the line of flow of the stream issuing from the orifice 21, and the parts are so positioned and adjusted that the shear blades 75 meet on the axis of the stream when in the closed position.

When the shear mechanism is in the uppermost position as shown in Fig. I the shear is open (as shown by the full line position of Fig. IV), and in this position each lug 81 is positioned slightly above the periphery of its associated cam roller 82. As the piston moves downwardly and carries with it the connected elements 77—78—76—76, etc., the lugs 81—81 are immediately engaged by the rollers 82—82, and the arms 76—76 are swung toward each other to close the shear blades 75—75 and sever the flowing stream of glass. It will be observed that as soon as this cam actuated movement has carried the springs 79—79 beyond their dead center, or maximum compression points, these springs will act to assist the cams in completing the severing operation; and will then act to hold the shear blades in their closed positions, after the lugs 81 have been carried beyond the roller discs 82 by the continued downward movement of the piston rod and its associated parts.

As the piston 84 approaches the end of its stroke the shear arms 76—76 approach a wedge-shaped lug 86, which is carried by a suitable cross-head 87 that is adjustably supported by the posts 11. This lug 86 is so located that its wedge-shaped upper end enters between the arms 76—76, and, moves these arms outwardly to such a position that the "snap" springs 79—79 again pass through dead center points and then act to return the shear blade elements to their open position. The piston 84 is then moved back again to its upper position—by connecting the upper end of the cylinder 83 to the vacuum conduit 57 (as later described); and in this upward movement the lugs 81—81 engage the inner inclined faces of the roller cams 82—82, and swing their supporting arms, 82a—82a, outwardly a sufficient distance to permit the lugs to pass between them, without causing any movement of the shear blade arms; after which the spring 82c acts to move the cam discs back again to operative position.

In order to more effectively support and guide the shear mechanism in its up and down movement I preferably provide the piston rod shaft 77 with an extension 77a, which passes through a bearing in the bracket 87, and is longitudinally grooved to engage with a spline pin that will prevent angular displacement of the vertically moving parts with respect to the center of the flow orifice, or with respect to the cam elements 82—82a, etc.

As previously stated, the piston 84 is operated by alternately connecting the upper end of the cylinder 83 to sources of super-atmospheric and sub-atmospheric fluid pressure. This is accomplished by means of a double poppet valve 88, which is also located in the valve box 56 and which is actuated by a cam 90 on the shaft 49. When this valve is moved down, by the cam, the lower poppet head is seated, and the upper head is unseated to admit compressed air from the conduit 64 to the chamber 89, between the valve heads, from which it passes, through the pipe 85 to the upper end of the cylinder 83. When the valve is lifted—by the joint action of the cam 90 and the valve stem return spring 92—the connection with the compressed air line 64 is cut off, and communication is established between the vacuum conduit 57 (through the branch passageway 60), the chamber 89, and the cylinder connection 85; and the piston 84 is then lifted by the superior pressure of the atmosphere on its under surface.

The downward movement of the piston 84 and associated parts may be cushioned by any desired means; but in the apparatus illustrated I have shown a series of small vent ports 95 in the lower end of the cylinder, which control the expulsion and admission of air to the space below the moving piston 84 during its downward and upward movements. These ports are located a short distance above the lower end of the cylinder, so that they are closed by the piston as it approaches the end of its down stroke. A cushion of compressed air is thus trapped in the bottom of the piston chamber, and serves to arrest the motion of the downwardly moving parts without shock or jar.

In order to assist in the proper delivery of the charges by the shear mechanism, and also to prevent any charge from being displaced laterally, by one or the other shear blades, during the severing operation, each blade is provided with a downwardly extending semi-cylindrical shield 96; which is so shaped that it, with the corresponding shield of the other blade, forms a laterally closed but open-ended guard sleeve when the blades are closed. It will be apparent that these two shields 96—96 encircle the depending end of the stream as the shear blades are moving toward each other; and when the shear blades are completely closed and the severance is completed, the severed charge is completely surrounded by the closed shields which not only retain it in a definite position, but also protect it from the cooling effect of the air during its subsequent downward travel.

As already stated, the lower end of the guard sleeve formed by the closed shields 96—96 is open; but inasmuch as the shear mechanism is moved downwardly at a more rapid speed than the charge would fall freely under the action of gravity, the upper end of the cut-off mass remains in contact with the lower surfaces of the closed shear blades, during this forced downward movement; and when the said downward movement is checked, the charge is projected through the open bottom of the sleeve, and into the mold even before the shears are completely opened by the coaction of the wedge and spring elements 86—79—79.

Briefly summarized the operation of the above described embodiment of my invention is as follows: As the plunger 35 moves downwardly in response to the movement of the cam 48, it closes off communication between the boot 10 and the passageway 22, thus trapping an accumulated quota of glass within the segregation chamber 23 and the supply passage 22. As this is accomplished, air under pressure is delivered through the port 52 to the upper end of the segregation chamber 23, thus accelerating the outflow of glass from that chamber through the delivery orifice 21. This operation is controlled, as heretofore described, by the cam 67, and the valve mechanism actuated thereby. When a sufficient quantity of glass has thus been expelled to form the desired mold charge, the plunger 35 is lifted by the cam 48, and the cam 67 then acts to shift the position of the valve assembly 58—64, and connect the top of the segregation chamber with the vacuum conduit 57. Concurrently with, or in close time relation to, this step in the operation of the feeder parts, the cam 90 comes into action to admit compressed air to the top of the cylinder 83, and move the shear mechanism downwardly at a rapidly accelerated speed, thus severing the flowing stream of glass at the time when it is issuing from the orifice under the action of gravity alone, and projecting the severed charge of material into the receiving receptacle, at a speed which is substantially in excess of that of free fall under gravitational force, and which is sufficiently high to permit of its delivery to the receptacle while the latter is moving. In the meantime a fresh quota of glass is being rapidly accumulated in the segregation chamber—while the molten material continues to flow freely from the delivery orifice under the pressure head of the downwardly moving column in the supply passage 22—and as soon as this accumulation is sufficient to complete the next mold charge, the plunger valve 35 is returned to its closed position, thus completing one cycle of feeder action.

In Figs. VIII to XIV, I have shown another form of apparatus embodying my invention. In this exemplification, the boot 150, which is supplied with a dominant pool of glass from a melting tank or furnace, as previously described, is also provided, at its forward end, with a sub-forehearth 152 which extends downwardly a substantial distance below the level of the molten material in the main supply pool. The boot 150 is enclosed in a sheet metal frame and is supported by upright posts 151; and the sub-forehearth 152 is also enclosed in a cylindrical shell 152a, which is bolted to the floor plate of the main forehearth. The sub-forehearth is provided with a central tubular sleeve 154 which is supported by a bottom plate 153 that is detachably secured to the shell 152a, and which projects upwardly through an aperture formed in the floor of the boot 150. The lower end of this sleeve is partially closed by a removable bushing or flow ring 158 which defines the size and shape of the delivery orifice 157 of the feeder. The outer diameter of the member 154 is materially less than the inner diameter of the sub-forehearth lining and the intervening annular space forms a heating chamber whose temperature is controlled by an electric coil 215 that is supplied with current from any suitable and regulatable source of electric energy.

A reciprocably and rotatably mounted refractory plunger 160 extends downwardly through the molten material in the upper boot, and into the sleeve 154. The lower end of th's plunger is cored out to provide a segregation chamber 163 whose inner diameter is preferably greater than that of the delivery orifice 157, and the external diameter of this portion of the plunger is such, with relation to the internal diameter of the member 154, as to provide an adequate supply passage 162, wh'ch communicates at its upper end with the dominant pool of glass in the main forehearth, and, at its lower end, with the flow orifice 157, and with the segregation chamber 163.

The upper end of the sleeve 154 projects somewhat above the floor of the boot 150, and forms a seat for a shoulder or flange 161, on the plunger 160, which serves to control the opening at the top of the supply passage 162, and thereby regulate the flow of glass therethrough. The upper end of the plunger 160 extends through the top of the boot, and in order to prevent the escape of hot gases at this point, the reciprocable member is surrounded by a tubular sleeve 165 which is tightly seated in the forehearth roof and which extend downwardly into the molten glass around the plunger.

The upper end of the plunger 160 is tightly clamped to a divided cap member 166, which is bolted to the lower extremity of a tubular shaft 167 that is detachably secured, at its upper end to a hub of a large ratchet wheel 168. The wheel 168 is rotatably supported on three equally spaced rollers 169 which are mounted on the upwardly projecting legs of an inverted tripod frame 171; and is held against lateral displacement with respect thereto by upper and lower bearing members 171a and 171b which respectively engage the hub of the wheel 168 and the tubular shaft 167. The lower head of the tripod frame 171—which carries the bearing 171d—is adjustably mounted on the side posts 151—151, and is supported at its front side by an adjustable foot screw 172, that rests on the roof of the forehearth; so that the frame may be either moved up and down parallel to itself, or may be tilted laterally to properly position the plunger 160 with relation to the sleeve 154. The frame 171 is held in contact with the screw 172 by means of a set screw 172a extending through a slot in lug 172b which projects outwardly from the shell 152a and is threaded into the lower bearing member 171b.

In order to intermittently rotate the plunger 160, the upturned edge of the wheel 168 is provided on its inner face with ratchet teeth 177 which are engaged by a pawl 178 that is carried by an arm 179, which is journaled on the hub of the wheel 168. The arm 179 is periodically oscillated to move the wheel 168 in a counterclockwise direction (Fig. IX) by means of a single acting piston 181—to which the arm 179 is connected by means of piston rod 180—which is slidably mounted in a cylinder 182 and is moved forward by admitting compressed air to the rear end of this cylinder, and is returned to its initial position—when the motive fluid is allowed to escape to the atmosphere—by a coil spring 187 which is attached to the arm 179 and the cylinder 182. The successive admission and exhaust of the compressed air, to and from the cylinder 182 is controlled by a suitable two-way valve 184 which is periodically actuated by the engagement of a suitable cam on the continuously revolving cam shaft 185 with the valve stem 186.

In order that the plunger 160 will be raised and lowered during each intermittent rotary movement of the wheel 168, the underface of the latter is provided with a contoured cam track (see Fig. XIV) which rides on the roller supports 169—169—169; and which is so shaped, that when the wheel is at rest the rollers will be engaged with the depressed portions 175—175—175 of the track, and the plunger assembly (160—167—168) will be lowered until the flange 161 is almost in contact with the top of the sleeve 154; thus substantially closing the upper end of the supply passage 162. On the next forward movement of the piston 181 in the cylinder 182, the resultant angular movement of the wheel 168, carries the elevated portions of the cam track over the rollers 169 and thereby raises the plunger assembly and places the passageway 162 in communication with the dominant supply pool of glass in the main forehearth.

The last described movements may be so timed (by the shape and setting of the actuating cam for the two-way valve 184) and so adjusted (by shifting the point of connection 180a, of the piston rod 180 with the slotted pawl arm 179) and by adjusting the stop screw 180b that each forward stroke of the piston 181 will move the wheel 168 through the angular distance between two successive recesses 175 on the cam track; or they may be so controlled (as above indicated) that one forward movement of the piston will rotate the wheel 168 through only one half this distance, and the next forward movement will rotate it through the remaining half of the aforesaid angular intervals.

The cross sectional area of the supply passage 162 and of the port opening between the top of the sleeve 154 and the raised plunger flange 161, is substantially greater than that of the flow orifice 157; so that a substantially larger volume of glass can flow downward through these openings than can be concurrently discharged from the delivery opening. This excess flow of glass will therefore pass into the segregation chamber 163, and will rapidly rise therein to provide a supplemental body or quota of the molten material which can be subsequently expelled therefrom to augment or increase the flow through the submerged delivery orifice 157.

In order to accentuate the accumulation of this supplemental supply of glass in the segregation chamber 163, and to also control the rate at which the molten material is expelled from the orifice when the plunger 160 is successively raised and lowered, I connect the top of the chamber 163 with the interior of the hollow shaft 167, by a tubular bolt 190—which is preferably made of nichrome or a similar non-corrosive and heat resistant alloy, and which also serves to assist in clamping the plunger 160 to its supporting cap 166—and provide the upper end of the hollow shaft with port openings 192 (in the wheel hub 170), which communicate with a chamber in the upper bearing box 171a that is in turn connected to suitable sources of sub-atmospheric and super-atmospheric pressure by the pipes 198 and 206.

The connection between the sub-atmospheric (vacuum) conduit 198 and the plunger shaft ports 192—192, etc., is controlled by a needle valve 194 which is mounted in a vertically adjustable valve box 195—and which is provided with a downwardly extended stem 193, that is engaged by the upper end of the wheel hub—and is raised, to open the valve, when the plunger members are in their upper positions (as shown in Fig. VIII). In this position the segregation chamber 163 is connected directly with the vacuum conduit 198; and the surface of the glass in this chamber is subjected to a sub-atmospheric pressure that may be regulated, in part by varying the initial pressure in the supply line, and in part by the adjustment of the valve elements 194—195.

In order to prevent the drawing of molten glass into the passageway 190—and thus plugging the connection between the chamber 163 and the tube 167—I employ a means for automatically closing the connection between the conduit 198 and the chamber 163, when the glass rises to a predetermined level therein. As illustrated in Fig. VIII, this means comprises the disc valve 203 which is provided with downwardly extended legs that normally rest on the upper head of the tubular bolt 190, and which is adjustably secured to a rod 201 that extends down through this bolt and is connected, at its lower end to a hollow ball float 200. As the glass rises in the chamber 163, it comes in contact with the float 200 and raises the disc valve 203, against the end of an adjustable collar 204 in the tube 167. This traps and confines such air, as remains in the chamber 163, and any subsequent rise in the level of the glass within the chamber will compress this trapped air, and immediately establish an equilibrium of pressures that will arrest the upward movement of the molten material.

As soon as the plunger and plunger shaft 160—167, are lowered—to close the upper end of the supply passage 162—the needle valve 194 is automatically closed by the spring 196; and the shaft port openings are concurrently placed in communication with a grooved recess 208 in the upper bearing block—which is connected by the pipe 206, to the central chamber of a compressed air control valve assembly 207. This valve assembly comprises a two-way needle-piston member 210—211, which is moved upwardly by a cam 213 on the cam shaft 185, and downwardly by a coil spring 214 interposed between the piston element 211 and the seat of the needle element 210. The upper end of the valve chamber—above the needle valve element 210—is connected to the compressed air supply conduit 183. When piston valve element 211 is lifted it first closes the lower end of the valve chamber, and thus cuts off communication between the pipe 206 and the external air—and then raises the needle valve 210 to connect the pressure line 183 with the pipe 206 and the recess 208, and admit compressed air to the hollow plunger shaft 167. This will, in turn, force down the raised disc valve 203 and subject the accumulated and segregated mass of glass in the chamber 163 to a controlled super-atmospheric pressure that will accelerate the outflow from the delivery orifice 157.

In order to effectively separate the successively enlarged stream sections, which are thus continuously produced, into mold charges, I employ a severing mechanism which has the same functional characteristics as the one heretofore described, but which differs therefrom in some details of construction.

This second illustrative embodiment of my improved shear mechanism comprises a pair of opposed shear blades 225 which may be of any suitable form but are preferably of the "cat's eye" type. Each blade is mounted on a separate shear arm 226, and each of these arms terminates, at its rear end, in a sleeve 227 which is slidably and rotatably mounted on one of the vertically disposed parallel guide rods 228—228 that are rigidly secured, at their upper ends to a bracket 238 on the operating cylinder 232, and, at their lower ends, to a cross-head 248 extending between the forehearth posts 151—151. The arms 226—226 are maintained in proper operative alignment with each other by two rectangular plates 229 and 229a, which engage the opposite sides of these arms and which are secured, as a unit to the lower end of a piston rod 230 that is attached at its upper end to a piston 231 slidably mounted in the cylinder 232; and the lower plate member of this unit assembly is also provided with guide bearings which slidably engage the rods 228—228.

The blades are normally held in their open position by coil springs 233 which are attached at their outer ends to the arms 226—226, and at their opposite extremities to laterally projecting side lugs on the upper plate 229a. The arms are provided, near their rear ends with cam rollers 234 which are adapted to engage and cooperate with inclined cam surfaces 235—235, and to move the shear blade members from the dotted line open position to the full line closed position of Fig. X, when the piston actuated shear arm supports are moved downwardly from the upper dotted line position of Fig. VIII. Each of the cam surfaces 235 is formed on the lower end of a downwardly extending arm 236 which is pivotally mounted on the cylinder bracket 238; and each of these arms is provided with a lug 239 which is normally held against the bottom of the flange 238 by means of a coil spring 240 (see Fig. XI); the arrangement being such that any downward thrust on the cam surfaces 235 tends to aid the spring 240 in holding the lugs 239 in contact with the bracket 238.

The piston 231 is moved down and up within the cylinder 232 by alternately connecting the upper end of the latter with the pressure and vacuum conduits 183 and 198. When the piston is at the top of its stroke, the shear blades are open; and in this position, each of the rollers 234 is positioned just above the upper edge of its cooperating cam surface 235. As the piston 231 moves downwardly, and carries with it the shear arms and guide frame elements 226—227—229—229a, etc., the shear blades are swung toward each other (by the cooperation of the cam rollers and cam surfaces 234—235) to sever the flowing stream of glass; the parts being of course so arranged and adjusted that the shear blades meet and cross each other on the axis of the stream while they are moving downwardly in line therewith.

When the blades are moved to the closed position, the arms 226—226 are locked together by means of a spring actuated latch 245 which is pivoted to one of the arms 226 and is adapted to engage a pin 246 on the other of the shear blade arms before the rollers 234 have moved beyond the cam surfaces 235. As the piston 231 approaches the lower limit of its stroke, the latch 245 is disengaged from the pin 246 by means of a vertically disposed wedge-shaped finger 247 that is mounted on the crosshead 248; and the arms and shear blades are returned to their open position by the springs 233. After the blades have been opened, the piston 231 and the parts connected thereto are returned to their upper position, by connecting the top of the cylinder 232 with the vacuum line 198; and as the shear frame approaches the end of this upward movement the rollers 234 engage the beveled ends 249 of the arms 236 and separate them sufficiently to permit the rollers 234 to pass between them, without disturbing the position of the separated shear arms. When the return movement is completed the rollers 234 have been lifted above the level of the cam surfaces 235, and the arms are then restored to their operative position (see Figs. VIII and XI) by the tension of the spring 240.

The above described movements of the piston 231, and of the parts associated therewith, are controlled by the action of a two-way valve (located in the valve box 250), which is similar in all essential respects to the corresponding valve 88 heretofore described in connection with Fig. II; and which is alternately moved up and down (in the box 250) under the control of a cam 262 on the cam shaft 185. When the valve is moved up the line 241, which leads to the upper end of the piston cylinder 232 is connected to the compressed air conduit 183; and when it is moved down this line (241) is put in communication with the vacuum conduit 198.

The cylinder 232 is provided at a point adjacent its lower end with a series of vent ports 256, which control the flow of air from and to the space below the moving piston; and which are closed thereby, near the end of its downward stroke, to provide a cushion of compressed air that will arrest the moving parts without sensible shock or jar. In order to assist the action of the downwardly moving shear blades in accelerating the delivery of the severed mold charges to the forming receptacles, each shear arm 226 is provided with a detachable semi-cylindrical shield 255; and when the blades are closed, these shields are brought together to form an inverted cup guard member, that closely embraces the sides and upper end of the severed charge as it is projected downwardly at a rapidly accelerated speed by the piston actuated parts.

The functional operation of the mechanism shown in Figs. VIII to XIV, inclusive, is substantially the same as that of the first described embodiment of my present invention. When the plunger shaft 167 and its supporting head 168 are rotated, the plunger 160 is lifted—by the co-action of the cam roller and the depressed track elements 169—175—and the supply passage 162 is opened to permit of a free gravity flow of glass from the parent body in the main forehearth, to the segregation chamber 163 and the delivery orifice 157. In order to accelerate the rapid filling of the chamber 163 by the excess flow from the main body of molten material, the upper end of the chamber may at this time be opened to the vacuum line 198—by the unseating of the valve 194, as the plunger is raised—and any overcharging, or over-accumulation of glass above the delivery orifice, is avoided (independently of whether a vacuum is or is not employed) by the automatic action of the float valve elements 200–203.

The means for rotating the plunger shaft elements 167—168 are so constructed and operated, that by the time the desired amount of glass has been transferred to the segregation chamber 163, the cam track wheel 168 will have been advanced by the angular distance between two successive cam track recesses 175, and will permit the plunger 160 to descend to shut off further flow of molten material into the supply passage 162. The downward movement of the members 167—168 permits the valve 194 to close, and puts the ports 192 in operative connection with the annular recess 208; after which compressed air may be introduced to the upper end of the segregation chamber 163 by the lifting of the needle valve element 210. The degree of pressure exerted on the glass, at this stage, may be regulated and controlled by the shape of the cam 213, and by the form or taper, of the said valve element.

After the desired quantity of glass has been expelled from the delivery orifice—under the combined action of gravity and super-atmospheric pressure—air is again admitted to the cylinder 183 (by the movement of the valve elements 184—186), and the plunger shaft wheel 168 is again set in rotation to move the recessed portions 175 of the cam track out of engagement with the supporting rollers 169, thereby lifting the plunger 160, and reopening the supply passage 162. This completes one cycle of the feeding operation.

Concurrently with, or immediately subsequent to, the establishment of the gravity flow conditions above described, compressed air is admitted to the top of the cylinder 232, and the piston actuated shear mechanism is moved downwardly. At the beginning of this movement, the co-engagement and coaction of the cam elements 234—235, closes the shear blades 225—225 and severs a charge of glass from the continuously flowing stream. The downward movement of the piston 231 is then rapidly accelerated by the increasing fluid pressure in the cylinder 232; and the closed shear blade and guard elements 225—225, 255—255 direct and project the severed charge, toward the receiving mold at a velocity which is not only greater than the maximum rate of flow of the oncoming stream, but is also preferably in excess of that which the severed charge would acquire under gravitational action alone. This rapid acceleration of the downward movement is aided by the fact that the mass of the moving parts is relatively small, and by the elimination of any retractive springs for the purpose of returning these parts to their upper position; and it is obvious that the accelerating force may be augmented to any desired degree, either by increasing the pressure in the compressed air supply line or by increasing the size of the cylinder 232. Shortly before the parts reach the end of the down stroke, the shear blades and guard elements 225—255 are opened and the charge is delivered to the mold at the highest attained velocity of movement. As soon as the blades have been opened, the downwardly moving elements are brought to rest by the compression of the air cushion in the bottom of the cylinder 232; and this action may be aided, if desired, by connecting the top of the cylinder to the vacuum line 198 before the end of the down stroke.

From the foregoing description, it is apparent that I always maintain a relatively high head of glass over the delivery orifice of the feeder; and thereby increase the rapidity of the gravity flow through the delivery orifice and also decrease the length of time required for replenishing the supply of glass in the segregation chamber. This filling or accumulation period is further decreased by partially exhausting the air from the top of the segregation chamber during this phase of the operation; and it is apparent that, by providing means for automatically arresting the inflow of glass, when it has reached a predetermined level in the chamber, I can definitely control the volume or head of the molten material which is accumulated above the delivery orifice, independently of any variations in the rate of flow from the parent body in the main forehearth. Since these successively accumulated and segregated charges are of a substantially constant and controlled amount, and since the rate of their expulsion from the delivery orific (during the periods of forced flow therefrom) can be regulated as desired—by the control of the admission of compressed air to the segregation chamber—and since the time, or phase, relations between these successive actions may be varied at the will of the operator, I can produce by the practice of my invention a regularly recurrent series of enlarged stream sections of definite shape and predetermined contour, which may be severed into a succession of mold charges of uniform weight and form, and may be delivered to the forming machine receptacle at a rate which is substantially in excess of that attainable with other present day feeders of the periodic retraction type.

It is further apparent, that by the use of my improved shear mechanism the successively severed mold charges can be delivered to the receiving receptacles of a forming machine at a velocity materially greater than they would attain under natural gravity fall; and that I can, thus, eliminate the necessity of bringing these receptacles to a stop for the purpose of receiving their charges, and thereby materially increase the speed of operation of the machine in which they are pressed and (or) blown to finished form, to correspond to the increased rate of their production by the feeder.

As already pointed out the shape or surface contour of the successively enlarged stream sections, which are to be cut into mold charges, can be varied within wide limits by the regulation of the super-atmospheric pressure which is used to supplement the action of gravity in expelling the glass from the segregation chamber after the supply passage thereto is closed. But this shape may be further controlled by altering the range of the plunger valve movements so as to change the degree of closing (or opening) of the supply passage leading from the main forehearth to the sub-forehearth chambers. This last change is effected either by adjusting the stop nut 260 of the first described organization; or by bodily lifting or lowering the tripod frame 171 of the construction shown in Figs. VIII and IX; or by independently adjusting the height of the stud bolts 169a on which the cam wheels 169 are rotatably mounted. To facilitate the readiness and accuracy with which this last adjustment may be made, each of these stud bolts is engaged by a set screw 261 that serves to define the position of the bolt in its slot; and to hold it against accidental displacement under the weight of the supported plunger members 160—167—168, etc. When the parts are so set that the upper end of the supply passage is not completely, or substantially, closed by the downward movement of the plunger valve, the subsequent application of a super-atmospheric pressure to the accumulated glass in the segregation chamber will result in a restricted back flow through the supply passages to the main body of glass in the forehearth, and will, to that extent, reduce the rate of expulsion through the delivery orifice, and correspondingly diminish the lateral swelling of the enlarged stream sections.

An additional control of the shape of each severed gob is attained by varying the initial downward speed of travel of the shear mechanism—which is accomplished by varying the rate at which compressed air is admitted to the operating cylinders (83 or 232) by the valves 88 or 250— and by altering the relation between this axial travel with the flowing stream and the accompanying transverse movement of the shear blades through the stream. This last mentioned alteration or adjustment is effected by changing either the size and axial positions of the cam wheels 82—82 (as best shown in Figs. I, IV and VII), or by changing the inclination of the cam surfaces 235—235 of my Fig. VIII construction. In either case, an increase in the speed of the transverse cutting movement of the shear blades, as compared with their concurrent downward movement will result in the production of blunter or more obtuse severed ends, and vice versa. A further control of the final shape of the severed mold charges may be secured by altering the internal contour of the guard sleeve elements which are attached to the ends of the shear arms and which embrace and confine the sides and upper ends of these charges during the time of their forced accelerated delivery to the receiving receptacles. In this connection, it is to be noted that these guard elements are preferably made of some thermally resistant material and are highly polished in both these inner and outer surfaces to reduce to a minimum any effect which they might otherwise have on the external surfaces of the hot material. This feature of construction is particularly important if the guard sleeve members are to exert any reshaping action of the enclosed mold charge. I desire it to be understood that I have designed various mechanisms for feeding molten glass and various procedures for feeding such material and that such mechanisms and procedures form the subject matter of and are claimed in copending applications but which structurally and functionally distinguish from the subject matter herein claimed.

What I claim as new and desire to secure by Letters Patent is:

1. A feeder for plastic material such as molten glass, comprising a receptacle for such material, a segregation chamber located wholly below the surface of the material within said receptacle with its lower end in open communication with a flow orifice, a delivery passage communicating at its upper end with said receptacle and at its lower end with said segregation chamber and said orifice, means responsive to variations in the level of the material within said segregation chamber for trapping a quantity of elastic fluid therein to arrest the flow of material into said chamber and prevent the overfilling thereof, and means for severing the stream of such material issuing from said orifice.

2. A feeder for plastic material such as molten glass comprising a receptacle for such material, a sub-forehearth forming a well beneath said receptacle and having a flow orifice in the bottom thereof, a hollow member in said well dividing the interior thereof into a segregation chamber and a delivery chamber, the lower ends of which are in communication with each other and with the orifice in said well, said delivery chamber communicating at its upper end with said receptacle and having a substantially greater sectional area than the area of said orifice whereby the material is delivered to the orifice faster than it can traverse the same with the excess material rising in said segregation chamber, a valve for alternately connecting the segregation chamber to sources of fluid pressure and suction to accelerate the flow through the orifice and speed up the filling of said segregation chamber, means for periodically operating said valve and means independent of said valve and responsive to variations in the level of material in the segregation chamber for closing the connection between said chamber and the source of suction to arrest the flow of material thereto.

3. A feeder for plastic material such as molten glass comprising a receptacle for such material, a sub-forehearth forming a well beneath said receptacle and having a flow orifice in the bottom thereof, a hollow member in said well dividing the interior thereof into a segregation chamber and a delivery chamber, the lower ends of which are in communication with each other and with the orifice in said well, said delivery chamber communicating at its upper end with said receptacle and having a substantially greater sectional area than the area of said orifice whereby the material is delivered to the orifice faster than it can traverse the same with the excess material rising in said segregation chamber, a valve for alternately connecting the segregation chamber to sources of fluid pressure and suction, means for periodically opening said valve, means operable when said segregation chamber is connected to the source of fluid pressure for closing the communication between said receptacle and said delivery chamber, and means independent of said valve and responsive to variations in the level of material within said segregation chamber for closing communication between said chamber and the source of suction to arrest the flow of material thereto.

4. A feeder for plastic material such as molten glass comprising in combination a receptacle for such material, a segregation chamber located wholly below the surface of the material in such receptacle and having its lower end in communication with a flow orifice, means for delivering material from said receptacle to said orifice and said chamber, means responsive to variations in the level of material in said chamber for trapping a quantity of elastic fluid therein to arrest the flow of material thereto and prevent the overfilling thereof, and means for periodically applying an expelling force to the glass in said segregation chamber.

5. A feeder for plastic material such as molten glass comprising a receptacle for such material, a sub-forehearth forming a well beneath said receptacle and having a flow orifice in the bottom thereof, a hollow member in said well dividing the interior thereof into a segregation chamber and a delivery chamber, the lower ends of which are in communication with each other and with the orifice in said well, said delivery chamber communicating at its upper end with said receptacle and having a substantially greater sectional area than the area of said orifice whereby the material is delivered to the orifice faster than it can traverse the same with the excess material rising in said segregation chamber, means responsive to variations in the level of material within the segregation chamber for trapping a quantity of elastic fluid therein to arrest the flow of material thereto, means for periodically introducing fluid pressure into said segregation chamber to expel the material therefrom and accelerate the flow through the orifice, and means operable when said chamber is connected to the source of pressure for closing the communication between the receptacle and the delivery chamber.

6. A glass feeder comprising a container for molten glass, a vertically extending sleeve communicating at its upper end with said container and having a restricted orifice at the bottom thereof, a vertically reciprocable bell projecting into said sleeve, a collar on said bell, means for reciprocating said bell to move said collar into and out of engagement with the top of said sleeve to thereby alternately close and open communication between said sleeve and said container, and means for alternately connecting the interior of said bell to sources of pressure and vacuum in timed relation to the movement thereof.

7. A glass feeder comprising a container for molten glass having an opening in the floor thereof, a sleeve-like member mounted in said opening and having a restricted orifice at the lower end thereof, a vertically reciprocable bell projecting into said container and extending into said sleeve-like member, a collar on said bell adapted on reciprocation of the bell to periodically cooperate with the upper end of said sleeve-like member and close communication between said container and said sleeve, a member secured to said bell and having a series of depressed portions in its underside, a series of rollers supporting said member and bell, and means for rotating said member to move said depressed portions across said rollers and reciprocate said bell.

8. A glass feeder comprising a container for molten glass having a sleeve communicating at its upper end with the glass in said container and at its lower end with a restricted orifice, a vertically reciprocable bell projecting into said container and extending into said sleeve, a collar on said bell adapted on reciprocation thereof to periodically cooperate with the upper end of said sleeve and close communication between said container and said sleeve, a member secured to said bell and having a series of depressed portions on the underside thereof, means for intermittently rotating said member to move said depressed portions across said rollers and reciprocate said bell, and means for connecting the interior of the bell to sources of pressure and vacuum in timed relation to the reciprocation thereof.

9. A glass feeder comprising a container for molten glass, a sleeve communicating at its upper end with the glass in said container and at its lower end with a discharge orifice, said sleeve extending a substantial distance below the bottom of said container, a vertically reciprocable member extending into said container and having a bell portion projecting into said sleeve, a collar carried by said member adapted on reciprocation thereof to periodically cooperate with the upper end of said sleeve and close communication between said container and said sleeve, an annular member secured to said bell member and having a series of spaced depressed portions on its underside, a series of spaced rollers supporting said annular member, an overrunning device for intermittently rotating said annular member to move said depressed portions across said rollers and reciprocate said bell member as it is rotated, and means for alternately connecting the interior of said bell to sources of pressure and vacuum in timed relation to the reciprocation thereof.

10. A glass feeder comprising a container for molten glass having an opening in the floor thereof, a sleeve mounted in said opening and having its upper end projecting into said container, said sleeve extending a substantial distance below the bottom of said container and having a restricted orifice at the lower end thereof, a vertically reciprocable member extending through said container having a bell portion projecting into said sleeve and located below the level of the glass in said container, a collar secured to said member adapted on reciprocation thereof to cooperate at one end of its stroke with the upper end of said sleeve and close communication between said container and said sleeve, an annular member secured to said bell member and having a series of spaced cut out portions in its underside, a series of rollers supporting said annular member, an overrunning device for intermittently rotating said annular member and said bell member to thereby move said cut out portions across said rollers and impart a reciprocatory motion to said bell as it is rotated, means for alternately connecting the interior of said bell to sources of pressure and vacuum in timed relation to the reciprocation of said bell to discharge the glass therein through the orifice and accelerate the filling thereof, and means responsive to the glass level within said bell for automatically closing the connection between said bell and the source of vacuum to prevent the overfilling of said bell chamber.

11. A feeder for plastic material such as molten glass, comprising a receptacle for a parent body of such material, a segregation chamber located wholly below the surface of such parent body and having its lower end in open communication with a flow orifice, a delivery passage communicating at its upper end with said receptacle and at its lower end with said chamber and said orifice, means responsive to variations in the level of the material within said segregation chamber for trapping a quantity of elastic fluid therein to arrest the flow of material into said chamber and prevent the overfilling thereof, means for closing communication between said parent body and said orifice, and means for periodically subjecting the material within said chamber to an expelling force to augment the flow through said orifice.

12. A feeder for plastic material such as molten glass comprising a receptacle for such material, a sub-forehearth forming a well beneath said receptacle and having a flow orifice in the bottom thereof, a stationary sleeve-like member positioned in said well and dividing the interior thereof into a segregation chamber and a delivery chamber, the lower ends of which are in communication with each other and with the orifice in said well, said delivery chamber communicating at its upper end with said receptacle and having a substantially greater sectional area than the area of said orifice whereby the material is delivered to the orifice faster than it can traverse the same with the excess material rising in said segregation chamber, means responsive to the variations in the level of the material in said chamber for trapping a quantity of elastic fluid therein to prevent the overfilling of said chamber, and means for periodically introducing fluid pressure into said segregation chamber to discharge the glass therefrom and accelerate the flow through said orifice.

13. A feeder for plastic material such as molten glass comprising a receptacle for such material, a sub-forehearth forming a well beneath said receptacle and having a flow orifice in the bottom thereof, a stationary sleeve-like member positioned in said well and dividing the interior thereof into a segregation chamber and a delivery chamber, the lower ends of which are in communication with each other and with the orifice in said well, said delivery chamber communicating at its upper end with said receptacle and having a substantially greater sectional area than the area of said orifice whereby the material is delivered to the orifice faster than it can traverse the same with the excess material rising in said segregation chamber, means responsive to the rise of glass in said segregation chamber for trapping a quantity of elastic fluid in said segregation chamber to prevent further flow of material thereinto, means for periodically introducing fluid pressure into said segregation chamber to accelerate the flow through the orifice, and means operable when said chamber is connected to the source of pressure for closing the upper end of said sleeve-like member to shut off communication between said receptacle and said delivery chamber.

14. A feeder for plastic material such as molten glass comprising a receptacle for such material, a segregation chamber located wholly below the surface of the material within said receptacle with its lower end in open communication with the flow orifice, a delivery passage leading from said receptacle to said segregation chamber, a valve for alternately connecting said chamber to sources of pressure and vacuum, means for periodically operating said valve, a second valve between said chamber and said source of vacuum, means responsive to the variations in the glass level in said chamber for operating said second valve, and means for severing the resultant flow from said orifice in timed relation to the operation of said first-mentioned valve.

15. A glass feeder comprising a container for molten glass, a segregation chamber located below said container with its lower end in open communication with a flow orifice, a delivery passage leading from said container to said segregation chamber, a reciprocable gate for alternately establishing and closing communication between said container and said delivery passage, means for periodically reciprocating said gate, a valve for connecting said segregation chamber to a source of fluid pressure, means for operating said valve in timed relation to the reciprocation of said gate, and means responsive to the glass level within said segregation chamber for trapping a quantity of elastic fluid therein to arrest the flow of material into said chamber irrespective of the position of said gate.

16. A glass feeder comprising a receptacle for molten glass having a delivery passage leading therefrom into a segregation chamber located below said receptacle, said segregation chamber being in open communication with a flow orifice, a reciprocable gate for establishing and closing communication between said receptacle and said delivery passage, means for periodically reciprocating said gate, a valve for connecting said segregation chamber to a source of pressure, means for operating said valve in timed relation to the movement of said gate, a valve associated with said segregation chamber, and means responsive to the glass level within said chamber for closing said last-mentioned valve to trap a quantity of elastic fluid therein and arrest the flow of material into said chamber irrespective of the position of said gate.

17. A glass feeder comprising a container for molten glass having a sleeve communicating at its upper end with the glass in said container and at its lower end with a restricted orifice, a vertically reciprocable bell projecting into said container and extending into said sleeve, a collar on said bell adapted on reciprocation thereof to periodically cooperate with the upper end of said sleeve to alternately close and open communication between said container and said sleeve, means for rotating said bell, and means responsive to the rotation of said bell for imparting reciprocatory motion thereto.

18. A glass feeder comprising a container for molten glass, a sleeve communicating at its upper end with said container and having a restricted orifice at the bottom thereof, a reciprocable bell projecting into said sleeve, a collar on said bell, means for rotating said bell, means responsive to the rotation thereof for reciprocating said bell to move said collar into and out of engagement with the top of said sleeve to thereby alternately close and open communication between said sleeve and said container, and means for alternately connecting the interior of said bell to sources of pressure and vacuum in timed relation to the reciprocatory movement thereof.

FRANK L. O. WADSWORTH.

CERTIFICATE OF CORRECTION.

Patent No. 2,144,470.                        January 17, 1939.

FRANK L. O. WADSWORTH.

It is hereby certified that error appears in the printed specification of the above numbered patent requiring correction as follows: Page 11, first column, line 65, claim 3, for the word "opening" read operating; and that the said Letters Patent should be read with this correction therein that the same may conform to the record of the case in the Patent Office.

Signed and sealed this 7th day of March, A. D. 1939.

Henry Van Arsdale.

(Seal)                                Acting Commissioner of Patents.

said container with its lower end in open communication with a flow orifice, a delivery passage leading from said container to said segregation chamber, a reciprocable gate for alternately establishing and closing communication between said container and said delivery passage, means for periodically reciprocating said gate, a valve for connecting said segregation chamber to a source of fluid pressure, means for operating said valve in timed relation to the reciprocation of said gate, and means responsive to the glass level within said segregation chamber for trapping a quantity of elastic fluid therein to arrest the flow of material into said chamber irrespective of the position of said gate.

16. A glass feeder comprising a receptacle for molten glass having a delivery passage leading therefrom into a segregation chamber located below said receptacle, said segregation chamber being in open communication with a flow orifice, a reciprocable gate for establishing and closing communication between said receptacle and said delivery passage, means for periodically reciprocating said gate, a valve for connecting said segregation chamber to a source of pressure, means for operating said valve in timed relation to the movement of said gate, a valve associated with said segregation chamber, and means responsive to the glass level within said chamber for closing said last-mentioned valve to trap a quantity of elastic fluid therein and arrest the flow of material into said chamber irrespective of the position of said gate.

17. A glass feeder comprising a container for molten glass having a sleeve communicating at its upper end with the glass in said container and at its lower end with a restricted orifice, a vertically reciprocable bell projecting into said container and extending into said sleeve, a collar on said bell adapted on reciprocation thereof to periodically cooperate with the upper end of said sleeve to alternately close and open communication between said container and said sleeve, means for rotating said bell, and means responsive to the rotation of said bell for imparting reciprocatory motion thereto.

18. A glass feeder comprising a container for molten glass, a sleeve communicating at its upper end with said container and having a restricted orifice at the bottom thereof, a reciprocable bell projecting into said sleeve, a collar on said bell, means for rotating said bell, means responsive to the rotation thereof for reciprocating said bell to move said collar into and out of engagement with the top of said sleeve to thereby alternately close and open communication between said sleeve and said container, and means for alternately connecting the interior of said bell to sources of pressure and vacuum in timed relation to the reciprocatory movement thereof.

FRANK L. O. WADSWORTH.

CERTIFICATE OF CORRECTION.

Patent No. 2,144,470.   January 17, 1939.

FRANK L. O. WADSWORTH.

It is hereby certified that error appears in the printed specification of the above numbered patent requiring correction as follows: Page 11, first column, line 65, claim 3, for the word "opening" read operating; and that the said Letters Patent should be read with this correction therein that the same may conform to the record of the case in the Patent Office.

Signed and sealed this 7th day of March, A. D. 1939.

Henry Van Arsdale.

(Seal)   Acting Commissioner of Patents.